United States Patent [19]

Grossmann et al.

[11] Patent Number: 5,421,229

[45] Date of Patent: Jun. 6, 1995

[54] AUTOMATIC LATHE

[75] Inventors: Walter Grossmann, Baltmannsweiler; Helmut F. Link, Aichwald, both of Germany

[73] Assignee: Index-Werke GmbH & Co. & KG Hahn & Tessky, Esslingen, Germany

[21] Appl. No.: 146,782

[22] Filed: Nov. 1, 1993

[30] Foreign Application Priority Data

Apr. 29, 1993 [DE] Germany ................. 9306460 U

[51] Int. Cl.⁶ ..................... B23B 13/02; B23B 31/02
[52] U.S. Cl. ........................... 82/124; 82/127; 82/129; 29/27 C
[58] Field of Search .............. 82/117, 124, 127, 129, 82/142, 149; 29/27 A, 27 C

[56] References Cited

U.S. PATENT DOCUMENTS

| 3,990,133 | 11/1976 | Schalles et al. | 29/27 C |
|---|---|---|---|
| 4,457,193 | 7/1984 | Matthey | 82/3 |
| 4,719,676 | 1/1988 | Sansone | 29/27 A |
| 5,031,490 | 7/1991 | Grossmann | 82/124 |
| 5,282,300 | 2/1994 | Girny et al. | 29/27 C |

FOREIGN PATENT DOCUMENTS

| 0310805 | 4/1989 | European Pat. Off. | |
|---|---|---|---|
| 0371450 | 6/1990 | European Pat. Off. | 82/124 |
| 3035451 | 5/1982 | Germany . | |
| 3514069 | 10/1985 | Germany . | |
| 8701318 | 3/1987 | WIPO | 82/124 |

Primary Examiner—William E. Terrell
Attorney, Agent, or Firm—Edward J. Timmer

[57] ABSTRACT

An automatic lathe having two workpiece spindles each provided with a workpiece clamping device and arranged with coaxial spindle axes. At least one of the workpiece spindles is arranged on a slide guided for displacement in the direction of the spindle axis and displaceable in the direction of the spindle axis by a drive element and a coupling device between the drive element and the slide. In order to compensate for axial movement component of the clamping device during clamping, the coupling device is designed such that in a first condition thereof, the slide is freely displaceable relative to the drive element in the direction of the spindle axis and opposite to the axial movement component of the clamping device. In a second condition of the coupling device, the slide is not displaceable relative to the drive element in the direction of the spindle axis.

14 Claims, 1 Drawing Sheet

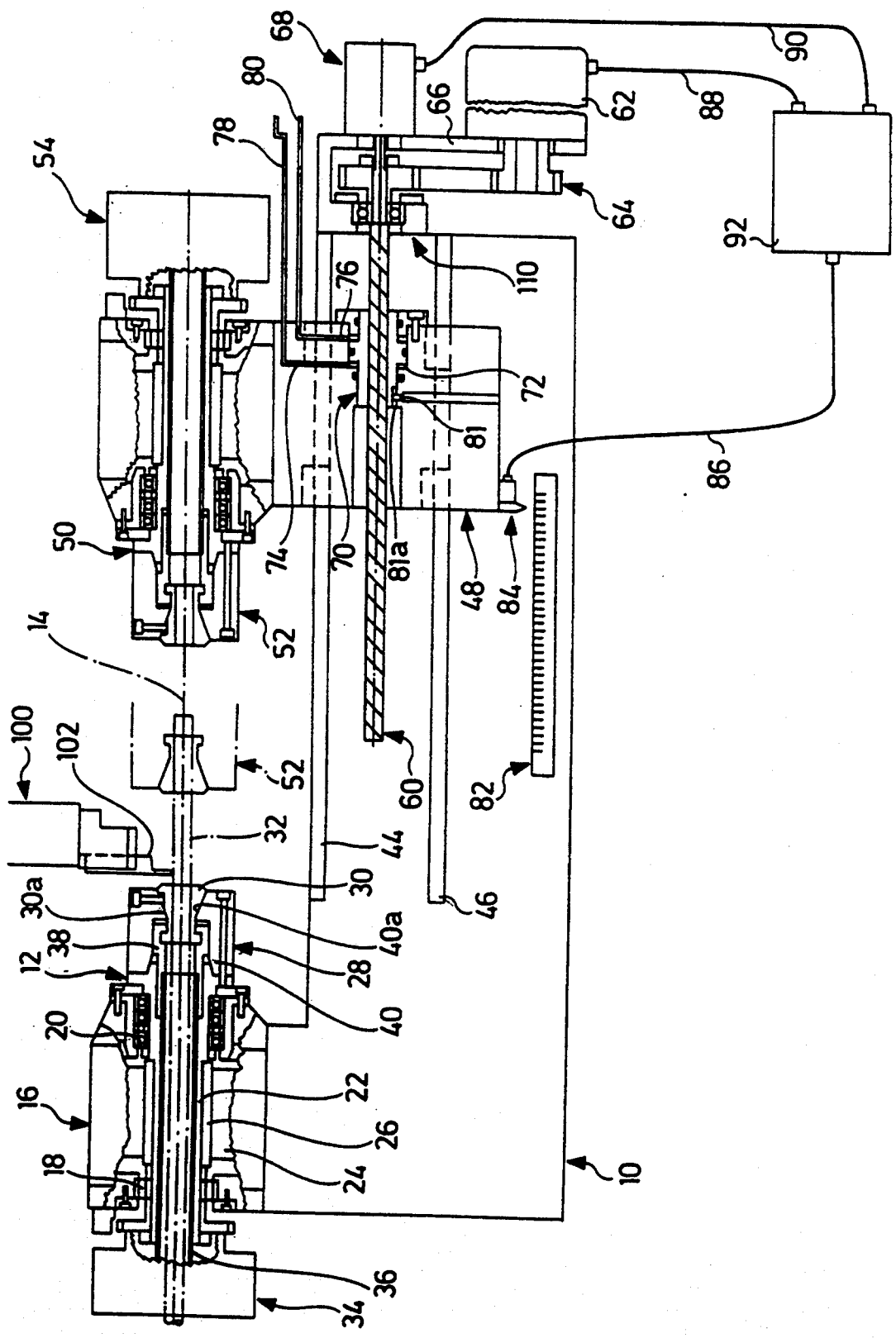

AUTOMATIC LATHE

BACKGROUND OF THE INVENTION

The invention relates to an automatic lathe which is designed as a so-called counterspindle machine, i.e. an automatic lathe comprising a machine base and at least two workpiece spindles which are each provided with a workpiece clamping means and are adapted to be positioned with coaxial spindle axes and workpiece clamping means facing one another. In counterspindle machines of this type, the workpiece spindles are not usually movable at right angles to the spindle axis, i.e. neither of the two workpiece spindles has a so-called X-axis or Y-axis; the invention can, however, also be used for those lathes, in which one or both of the workpiece spindles is or are displaceable in the direction of the X-axis and/or the Y-axis.

Counterspindle machines of the type in question are known, for example, from DE-PS 35 14 069, DE-PS 30 35 451 and EP-B-0 310 805. They enable a workpiece to be machined completely in two settings. In this respect, the workpiece is held first of all in the clamping means of the one workpiece spindle and the workpiece portion protruding from this clamping means is machined. Thereupon, the workpiece is taken over by the other workpiece spindle and the workpiece area which is not machinable in the first step is now machined. In order, above all, to transfer the workpiece from the one workpiece spindle to the other at a correct angle of rotation, the workpiece must be clamped in the clamping means of the second workpiece spindle before the clamping means of the first workpiece spindle is opened.

Bar stock, i.e. bar-like raw material, is often processed on such counterspindle machines. For this purpose, at least the workpiece spindle performing the first machining steps is designed as a hollow spindle, through which stock bar is pushed from behind, i.e. from the side of the first workpiece spindle facing away from the counterspindle, through the first workpiece spindle as far as the operating space of the automatic lathe located between the two workpiece spindles and then clamped in the clamping means of the first workpiece spindle. Following machining of the forward region of the stock bar which protrudes out of the first workpiece spindle and later forms the workpiece, the counterspindle is pushed with its clamping means over the machined, forward region of the bar stock and this is clamped in the counterspindle. Subsequently, the bar region forming the later workpiece is severed from the stock bar by means of a so-called parting tool, both workpiece spindles being driven at the same rotational speed with their clamping means closed. The region on the rear side of the workpiece held in the counterspindle can then be machined.

When machining bar stock, it is often necessary to feed the stock bar in the direction towards the counterspindle with its help. In the case of very long workpieces, in particular, it is not possible to advance the stock bar through the first workpiece spindle against a stop located outside the counterspindle, namely when the stock bar has to be pushed forward to such an extent that its front end comes to rest outside the operating space of the automatic lathe and inside the counterspindle or its clamping means. In these cases, the front end of the stock bar is clamped in the counterspindle before it is advanced, whereupon the clamping means of the first workpiece spindle is opened and the counterspindle moved back by a distance which corresponds to the desired bar feed.

In all these cases, it becomes disadvantageously apparent in conventional counterspindle automatic lathes that the workpiece clamping means, such as so-called tension or pressure collets, which are customarily used are constructed such that, during a clamping action, their clamping zones which engage on a part to be clamped in them undergo a movement which has a movement component parallel to the spindle axis. During the transfer of a workpiece at the correct angle of rotation, the clamping means of the counterspindle must be closed before the clamping means of the first workpiece spindle is opened; the same applies to the cutting off or severing of the later workpiece from the stock bar. Also, when the stock bar is fed with the aid of the counterspindle, the clamping means of the first workpiece spindle must be closed before the clamping means of the counterspindle is opened. In all these cases, the later workpiece, while one of the two workpiece clamping means is being closed, is displaced in the direction of the spindle axis relative to the clamping zones of at least one of the two clamping means and this leads to undesired markings on the workpieces produced on the automatic lathe as well as to inaccuracies in the length of the workpieces measured in the direction of the workpiece spindle axis. When cutting off the later workpiece from a stock bar by means of a parting tool, this characteristic of the workpiece clamping means normally used can also lead to the parting tool becoming jammed or deflected in an undesired manner in the direction of the spindle axis since, in order to achieve machining times per piece which are as short as possible, the clamping procedure is not completely terminated when the parting tool begins operation.

SUMMARY OF THE INVENTION

The object underlying the invention is to construct an automatic lathe designed as a counterspindle machine such that the disadvantage described can be avoided in at least one of the modes of operation described above.

Proceeding on the basis of an automatic lathe having a machine base and at least two workpiece spindles each having a workpiece clamping means, the workpiece spindles being adapted to be positioned with coaxial spindle axes and workpiece clamping means facing one another, at least one of the workpiece spindles being arranged on a slide which is displaceably guided in the direction of the spindle axis and in this direction controllably displaced by a drive means, at least one of the clamping means being designed such that, in the course of a clamping action, its clamping zones gripping a part to be clamped therein undergo a movement having a component parallel to the spindle axis, and the drive means having a drive element which is coupled to the slide via coupling means, extends in the direction of the spindle axis and the length of which is at least equal to the maximum slide displacement, this object may be accomplished in accordance with the invention in that the coupling means is designed such that in a first state or condition of the coupling means the slide is freely displaceable relative to the drive element in the direction of the spindle axis, opposite to the movement component of the clamping zones, and in a second condition of the coupling means the slide is undisplaceable relative to the drive element in the direction of the spindle axis, and that displacement measuring means are provided for measuring the axial displacement of the slide relative to the drive element.

In an inventive automatic lathe, closure of one of the clamping means, the clamping zones of which gripping the part to be clamped undergo a movement during the clamping action having a movement component parallel to the spindle axis, does not lead to length tolerances of the workpieces and/or to markings or other damage to the part to be clamped, irrespective of whether this is a workpiece to be transferred from one workpiece spindle to the other, a part to be cut from a stock bar or a stock bar which is to be pushed or drawn forwards, since during the clamping action, during which the coupling means is in its first condition, the slide bearing the one workpiece spindle can be freely displaced to compensate for the specified axial movement component. On the other hand, it can be ensured in the inventive automatic lathe that the slide and the workpiece spindle carried by it are not displaced in the direction of the spindle axis when machining is carried out with the workpiece spindle borne by this slide since, to prevent such displacements, it is merely necessary to bring the coupling means into its second condition, e.g. by having the slide moved by the coupling means against a stop which is stationary on the machine base and then held non-displaceably between the stop and the coupling means. Finally, any longitudinal displacement of a workpiece or a stock bar relative to the machine base, which is caused by the closure of a clamping means and otherwise not detected by the machine control, can be measured with the displacement measuring means and the measured value transmitted to the machine control.

CNC automatic lathes are provided with displacement measuring systems which detect the positions of the machine slide relative to a zero point which is stationary on the machine frame so that the actual slide positions can be taken into account for the machining of a workpiece. Due to their absence of play, the machine slides are customarily driven by means of so-called ball roller spindles. In this case, the distance measuring system in known automatic lathes consists of a high-definition angle-position indicator (resolver) which is connected to the threaded spindle of a ball roller spindle system and also connected to the machine control so that the momentary slide position (relative to the machine base) is known at any time to this control. A displacement measuring method of this type is, however, inadequate for an inventive automatic lathe. Since the coupling means are subject to play, the angular position of the threaded spindle cannot provide any precise indication of the actual position of the slide relative to the machine base. For this reason, the invention, possibly in addition to a displacement measuring system of the type described in the above, provides displacement measuring means for measuring a displacement of the slide relative to the drive element which is constructed, in particular, as a ball roller spindle. In preferred embodiments of the inventive automatic lathe, a displacement measuring system for determining the position of the slide relative to the machine base is associated with the slide which is freely displaceable for compensating the clamping action and so the position of the slide, or the spindle borne thereby, resulting after a clamping action is detected immediately by this displacement measuring system and can be compared with the nominal position of the workpiece spindle memorized in the control, the result of this comparison being further computed in the machine control.

The inventive automatic lathe can have a number of features which are known per se from generic automatic lathes:

If bar stock is to be machined with the inventive automatic lathe, at least one of its workpiece spindles is to be designed as a hollow spindle. If very long workpieces are to be machined on the automatic lathe or finished workpieces withdrawn from the operating space to the rear through the second workpiece spindle, both workpiece spindles are to be constructed as hollow spindles.

During machining of bar stock, this is always supplied by a so-called bar feed to the first of the two workpiece spindles from behind. In this case, it is recommended that this first workpiece spindle which is designed as a hollow spindle be arranged on the machine base so as to be non-displaceable in the direction of the spindle axis.

Normally, both workpiece spindles are equipped with workpiece clamping means of the same type even though it is, of course, conceivable to provide only the displaceable workpiece spindle, in particular the second workpiece spindle (also called a counterspindle), with a clamping means having chuck jaws which undergo a movement having a component parallel to the spindle axis during a clamping action.

In inventive automatic lathes which are of a particularly simple construction, the coupling means has an entrainment element movable by the drive element in the direction of the spindle axis, this entrainment element being displaceable relative to the slide in the direction of the spindle axis between two stops fixed relative to the slide. In an automatic lathe of this type, the entrainment element can be moved by the drive element, prior to a clamping action, against that one of the two stops fixed relative to the slide, which is located to the back in the direction of the specified movement component, so that during the clamping action the specified relative movement between clamping means and workpiece or stock bar can be compensated by the play present between the entrainment element and the other stop fixed relative to the slide. It is, however, also possible to design the coupling means such that it securely couples the slide with the drive element in the direction of the spindle axis by means of a switchable brake, coupling, clamping means or the like, or releases this drive connection between the slide and drive element so that in the last-mentioned state the slide can be freely displaced in an unlimited manner. It would also be conceivable to inactivate any axial play present between the entrainment element and slide with switchable blocking means.

In a preferred embodiment of the inventive automatic lathe, the coupling means of which comprises the specified entrainment element, the latter forms a piston and the stops fixed relative to the slide are formed by a cylinder chamber of a pressure-fluid cylinder unit, to which this piston belongs. The play required between the entrainment element and slide can then be provided in a simple manner by moving the piston against the corresponding end of the cylinder chamber. In this case, it is to be recommended that the pressure-fluid piston-cylinder unit be designed as a double acting unit, namely not only for the purpose of being able to fix the piston in position in the cylinder chamber but also to be able, if necessary, to take into account the circumstance that an axial clamping movement at the workpiece spindle not borne by the slide has to be compensated.

The drive element could, for example, be part of an electrical linear motor or it could be a piston rod of a pressure-fluid cylinder unit. However, the drive element is normally a threaded spindle so that the nut travelling thereon can form the entrainment element. In such a case, a pressure-fluid cylinder unit accommodating the entrainment element designed as a piston can, however, be dispensed with because the necessary play can be brought about on the desired side of the entrainment element quite easily by a rotation of the threaded spindle in the required direction of rotation.

Finally, the invention also relates to a method for producing workpieces on a counterspindle automatic lathe, in which, according to the invention, when a workpiece is clamped in one of the workpiece spindles, at least one of these spindles is displaced with the workpiece in the direction of the spindle axis and blocked again for machining.

DESCRIPTION OF DRAWINGS

Additional features, advantages and details of the invention result from the following description and/or from the attached, schematic illustration of a particularly advantageous embodiment of the inventive automatic lathe. The drawing merely shows the parts of the automatic lathe necessary for understanding the invention, namely in the form of a longitudinal section through the two workpiece spindles, the parts bearing them and the drive means for the counterspindle which has been illustrated with solid lines in an end position to the right in the drawing and with dash-dot lines in an advanced position.

DESCRIPTION OF THE INVENTION

The drawing shows a machine base 10, on which a first workpiece spindle 12, designated in the following as main spindle for the sake of simplicity, is arranged so as to be non-displaceable in the direction of a spindle axis 14. Bearings 18 and 20 are arranged in a headstock 16 serving to bear the main spindle 12. A spindle body 22 of the main spindle 12 in the form of a hollow shaft is mounted with the aid of these bearings for rotation about the spindle axis 14. A so-called electrical, hollow-shaft motor serves to drive the spindle body 22 and consists essentially of a stator 24 fixed relative to the headstock and a rotor 26 securely connected to the spindle body 22. At its front end (to the right in the drawing) the spindle body 22 bears a workpiece clamping means 28 of the known constructional type which has a so-called tension collet 30, with which, for example, a stock bar 32 indicated in the drawing by dash-dot lines can be clamped and fixed in position in the main spindle 12 coaxially to the spindle axis 14. For actuating the collet 30, the main spindle 12 is provided with a hydraulic clamping cylinder 34 which is not illustrated in greater detail and the piston rod 36 of which bears a sleeve-like collet holder 38, with the aid of which the collet 30 can be limitedly displaced back and forth in the direction of the spindle axis 14. A collet housing 40 is attached to the front end of the spindle body 22. This housing includes the collet 30 and has an inner conical surface 40a, on which an outer conical surface 30a of the collet 30 abuts. The latter has, as known, the shape of a sleeve which is provided with slots extending into the collet body from their right-hand end, according to the drawing, so that the regions of the collet part to the right of the drawing, which are located between these slots, form clamping elements which can be deflected elastically inwards, to the left according to the drawing, by displacing the collet 30 relative to the collet housing 40. This reduces the inside diameter of the collet 30. By actuating the clamping cylinder 34, i.e. by displacing its piston rod 36 to the left according to the drawing, the stock bar 32 can, for example, be firmly clamped in the collet 30 whereas the collet 30 opens again when it is displaced to the right relative to the collet housing 40. During the clamping action, each of the clamping elements of the collet 30 undergoes a movement which has not only a radial component relative to the spindle axis 14 but also a component in the direction of the spindle axis 14, namely, in the case of the main spindle 12, a movement component directed to the left according to the drawing. If, for example, the stock bar 32 which is freely movable in the direction of the spindle axis 14 is clamped in the collet 30, it will be displaced slightly to the left according to the drawing during the clamping action.

Two guide bars 44 and 46 are attached to the machine base 10. These bars extend parallel to the spindle axis 14 and serve to guide a slide 48 which bears a second workpiece spindle 50, referred to in the following as a counterspindle for the sake of simplicity. A workpiece clamping means 52 and a clamping cylinder 54 are also associated with this spindle. The counterspindle 50, its workpiece clamping means 52 and its clamping cylinder 54 are designed and arranged in the same manner as the main spindle 12, its clamping means 28 and its clamping cylinder 34. The counterspindle 50 is also driven in the same manner as the main spindle 12. In addition, the counterspindle 50 is arranged coaxially to the spindle axis 14; however, the arrangement of the main spindle 12 and the counterspindle 50 as well as the structural components associated with the two workpiece spindles is in mirror symmetry to a central plane which extends at right angles to the spindle axis 14 and between the two workpiece spindles.

A drive means for the slide 48 will now be explained in the following.

This comprises a threaded spindle 60 mounted on the machine base 10 so as to be rotatable but axially non-displaceable. The threaded spindle extends parallel to the spindle axis 14 and is a so-called ball roller spindle. It is driven by an electromotor 62 via a toothed belt gear 64, the motor being held by an arm 66 secured to the machine base 10. Moreover, the threaded spindle 60 is connected to an angle-position indicator 68 which is held by the arm 66 and with which the rotation of the threaded spindle, including its momentary angular position, can be monitored for the purpose of controlling the automatic lathe.

The threaded spindle 60 traverses the slide 48 and a nut 70 travels along it. This nut forms a piston 70a, for which a cylinder chamber 72 is formed in the slide 48 and the piston 70a can be displaced therein in a limited manner in the direction of the spindle axis 14. Hydraulic oil bores 74 and 76 lead to the two ends of the cylinder chamber 72 and flexible hydraulic oil lines 78 and 80, respectively, are connected to them. The nut 70 is arranged on the slide 48 so as to be non-rotatable due to a locating pin 81, which engages in a groove 81a in the slide 48 extending in the direction of the spindle axis 14, but displaceable to a limited extent in the direction of the spindle axis 14.

Finally, a preferably incremental displacement measuring system is associated with the slide 48 and this consists of a scale 82 fixed on the machine base and an active pick-up 84 which is mounted on the slide 48 and is connected to a machine control 92 in the same manner as the angle-position indicator 68 and the electromotor 62 via lines 86, 88 or 90. When the pick-up 84 is moved along the scale 82 during displacement of the slide 48 parallel to the spindle axis 14, it transmits digital signals to the machine control 92 in accordance with the displacement increments covered so that the machine control can determine the actual position of the slide 48 relative to the machine base 10 at any point of time.

Finally, the drawing shows a tool carrier 100 which is intended to be mounted by a slide, which is not illustrated and is displaceable transversely as well as parallel to the spindle axis 14, and bears a so-called parting tool 102. With this tool a region of the stock bar 32 which later forms a workpiece can be severed from this bar in that the stock bar 32 is clamped in the clamping means 28, 52 and caused to rotate with the workpiece spindles 12, 50 which are driven in the same direction and at the same rotational speed, whereupon the parting tool 102 is advanced at right angles to the spindle axis 14 onto the stock bar 32 and as far as the spindle axis.

Apart from the fact that the nut 70 forms a piston 70a and the slide 48 a cylinder chamber 72 for this piston and that the displacement measuring system 82, 84 is provided, the fundamental construction of the automatic lathe illustrated in the drawing corresponds to the state of the art insofar as it has so far been described.

The drawing is intended to explain the process of severing a front portion (to the right in the drawing) of the stock bar 32. This portion has been previously machined by tools which are not illustrated while the stock bar 32 was clamped in the main spindle 12 in the position illustrated in the drawing. Once this front region of the stock bar 32 has been machined, the counterspindle 50 is advanced to the left out of the position illustrated by solid lines in the drawing, with the aid of the motor 62 and the threaded spindle 60, to such an extent until it takes up the position illustrated in the drawing by dash-dot lines. In this respect, the workpiece clamping means 52 is open so that it can be pushed over the front end of the stock bar 32. During the forward displacement of the counterspindle 50 and, with it, the slide 48, the cylinder chamber 72 can be pressureless on both sides of the piston 70a so that the piston abuts on the left end wall of the cylinder chamber 72 and then moves the slide 48 and, with it, the counterspindle 50 to the left. However, for displacing the counterspindle 50 the right side of the piston 70a is expediently acted upon by pressure oil via the line 80 and thus pressed against the left end wall of the cylinder chamber 72. This results in a space to the right of the piston 70a between the piston and the right end wall of the cylinder chamber 72, i.e. play between piston and slide. In the case where pressure acts on the piston 70a during the displacement of the counterspindle 50 the cylinder chamber 72 is subsequently made pressureless.

Since the stock bar must be caused to rotate to sever the front region of the stock bar, it must remain clamped in the workpiece clamping means 28 of the main spindle 12. When the clamping means 52 of the counterspindle 50 is tensioned, i.e. closed, it attempts to draw the stock bar 32 to the right. However, since the clamping means 28 of the non-displaceable main spindle 12 is still closed and, when the cylinder chamber 72 is pressureless and the piston 70a abuts on the left end wall of the cylinder chamber, the slide 48 is freely displaceable to the left, even if to a limited extent, the clamping means 52 does not draw the stock bar 32 to the right but, rather, the slide 48 to the left which merely presupposes that the extent of the play between piston 70a and slide 48 corresponds at least to the movement component of the clamping elements of the clamping means 52 in the direction of the spindle axis 14 during the clamping action.

It should be mentioned that for minimizing the so-called machining times per piece the main spindle 12 and the counterspindle 50 are driven in the same direction and at the same rotational speed, while the stock bar 32 is also clamped in the clamping means 52 of the counterspindle 50, so that it is not necessary first of all to brake and stop the main spindle 12 and then bring the two spindles 12, 50 to operational rotational speed for severing the workpiece from the stock bar 32 with the aid of the parting tool 102.

Since, during clamping of the stock bar 32 in the clamping means 52 of the counterspindle 50, the slide 48 and also the counterspindle 50, which is intended to hold the workpiece for later final machining, are displaced to the left relative to the machine base 10 and the threaded spindle 60, the actual position of the slide 48 or the counterspindle (in the direction of the spindle axis 14 relative to the machine base 10) is detected with the aid of the displacement measuring system 82, 84 after the stock bar 32 has been clamped in the counterspindle 50. It is then compared by the machine control 62 with the zero point of the workpiece to be produced, which is predetermined by the operating program, and the result of this comparison further computed in the machine control in order to be able to memorize the axial position of the workpiece relative to the counterspindle 50 in the machine control for the additional machining (during the subsequent final machining of the workpiece only the data concerning the tool positions and the position of the counterspindle 50 are available to the machine control).

Subsequently, the parting tool 102 is advanced towards and as far as the spindle axis 14 and severs a part which forms the later workpiece from the remaining stock bar 32; this part then remains clamped in the clamping means 52.

The procedure can then be as follows: The counterspindle 50 is driven back (to the right according to the drawing) and pressure oil is passed to the right side of the piston 70a via the hydraulic oil line 80. Once the slide 48 and, with it, the counterspindle 50 have then been secured in position in the direction of the spindle axis 14 relative to the threaded spindle 60, the actual position of the counterspindle (relative to the machine base 10) is again determined with the aid of the displacement measuring system 82, 84 in order to obtain the relevant axial position of the workpiece zero point relative to the threaded spindle 60 for the final machining of the workpiece and to be able to transmit this to the machine control 92. Then, the previous rear side, i.e. according to the drawing the left end region of the workpiece held in the counterspindle 50, is finally machined with the aid of tools which are not illustrated.

This could also be achieved if the nut 70 and the slide 48 did not together form a double acting pressure-fluid cylinder unit but, instead, the nut 70 with its collar forming the piston 70a in the first embodiment described could be displaced only in the direction of the spindle axis 14 to a limited extent relative to the slide 48. When advancing the slide 48, i.e. moving it to the left according to the drawing, this collar abuts on the left stop formed by the slide 48 so that when the clamping means 52 is closed the slide 48 can be displaced to the left relative to the nut 70. If, after the workpiece is severed from the stock bar 32, the slide 48 is moved back, i.e. displaced to the right according to the drawing, to such an extent until it abuts on a stop 110 fixed relative to the machine base, the nut 70 abuts on the right stop of the slide 48 so that this is clamped between the stop 110 and the nut 70.

If the clamping means 52 were designed such that, when it is being closed, it would attempt to move the part to be clamped to the left according to the drawing, it would be necessary to have the piston 70a abutting on the right end wall of the cylinder chamber 72, after the slide 48 has been advanced, by having pressure oil acting upon the left side of the piston 70a via the hydraulic oil line 78. This could also be achieved by reversing the direction of rotation of the counterspindle 60 after the slide 48 has been advanced until the collar of the nut 70 abuts on the right stop formed by the slide 48.

If the stock bar 32 is intended to be advanced with the aid of the counterspindle 50, i.e. drawn to the right according to the drawing, before the later workpiece is machined by tools which are not illustrated and then severed from the stock bar 32 while the stock bar is clamped in the clamping means 28 of the main spindle 12, the clamping means 52 of the counterspindle 50 is pushed onto the stock bar 32 while the clamping means 28 is closed and the clamping means 52 then closed, whereby the axial movement component of the clamping elements of the clamping means 52 is compensated by a movement of the slide 48 relative to the nut 70. The actual position of the slide 48 and, with it, the counterspindle 50 is then determined with the aid of the displacement measuring system 82, 84, whereupon the clamping means 28 is opened and the slide 48 withdrawn to the right according to the drawing by a distance corresponding to the desired bar feed. As, subsequently, the stock bar 32 is intended to be clamped again in the clamping means 28 of the main spindle 12, the piston 70a must now abut on the left or right end side of the cylinder chamber 72 (dependent on the direction of the axial displacement of the stock bar 32 relative to the machine base 10 which results during closure of the clamping means 28 of the main spindle 12). As already described, this can be achieved by supplying pressure oil via the line 78 or the line 80 to one of the two sides of the piston 70a or—when no double acting pressure-fluid cylinder unit is provided—by displacing the nut 70 relative to the slide 48 in a corresponding direction by rotating the threaded spindle 60 in a corresponding direction of rotation through an angle of rotation predetermined by the machine control 92.

In the case of an inventive automatic lathe having a double acting pressure-fluid cylinder unit, the cylinder chamber 72 is to be made pressureless prior to the stock bar 32 being clamped in the main spindle 12 so that the stock bar 32 still clamped in the counterspindle 50 and the slide 48 can be freely displaced in axial direction when the stock bar is being clamped in the main spindle 12. Once the stock bar 32 has been clamped in the main spindle 12, the actual position of the counterspindle 50 is again determined with the aid of the displacement measuring system 82, 84 so that the machine control 92 can form the difference between the positions of the slide 48 prior to and after the advancing of the stock bar 32. This is equal to the actual axial displacement of the stock bar 32 relative to the main spindle 12, i.e. equal to the actual stock bar feed.

It is apparent from the above that in an embodiment having a double acting pressure-fluid cylinder unit 70a, 72 the slide 48 need not be moved against the stop 110 fixed relative to the machine base in order to be able to machine a workpiece held in the counterspindle 50 since the play between slide 48 and piston 70a can be eliminated by pressure oil acting on the one piston side accordingly.

The present disclosure relates to the subject matter disclosed in German application No. G 93 06 460.8 of Apr. 29, 1993, the entire specification of which is incorporated herein by reference.

We claim:

1. Automatic lathe having a machine base, two workpiece spindles each having a workpiece clamping device, actuating means for closing and opening said clamping devices, and mounting means for positioning said spindles coaxially and with their clamping devices facing each other, said mounting means comprising bearings for mounting each of said spindles for rotation about a common spindle axis, at least one of said spindles being arranged on a slide displaceably guided in the direction of said spindle axis relative to said machine base, and with drive means for controllably displacing said slide in said direction, at least a first one of said clamping devices having at least one clamping element with clamping surface zones adapted for clamping a part to be gripped between said surface zones when the first clamping device is closed by said actuating means, said first clamping device being designed such that, when the first clamping device is closed by said actuating means, said surface zones of the first clamping device undergo a movement having a component parallel to said spindle axis, said drive means having a drive element extending in the direction of said spindle axis, the improvement comprising coupling means for coupling said drive element to said slide, said coupling means having a first condition in which said slide is freely displaceable relative to said drive element in the direction of said spindle axis and opposite to the direction of said component of movement, and a second condition in which said slide is undisplaceable relative to said drive element in the direction of said spindle axis, and displacement measuring means for measuring the axial displacement of said slide relative to said drive element.

2. Automatic lathe as claimed in claim 1, wherein at least one of said spindles is in the form of a hollow spindle for receiving bar stock to be machined.

3. Automatic lathe as claimed in claim 2, wherein the hollow spindle through which bar stock to be machined is fed is stationary relative to said machine base.

4. Automatic lathe as claimed in claim 1, wherein the spindle displaceable relative to the machine base is provided with said first clamping device.

5. Automatic lathe as claimed in claim 1, wherein both spindles are provided with clamping means having said clamping surface zones which, in the course of a clamping action, undergo a movement with a component parallel to said spindle axis.

6. Automatic lathe as claimed in claim 1 and having a stop means stationary relative to said machine base, said slide being adapted to abut on said stop means when the distance between the two spindles is being increased.

7. Automatic lathe as claimed in claim 1, wherein said coupling means has an entrainment element drivable by said drive element in the direction of said spindle axis, said entrainment element being displaceable relative to said slide in the direction of said spindle axis between two stop means, said two stop means being fixed relative to said slide.

8. Automatic lathe as claimed in claim 7, wherein said entrainment element forms a piston and said two stop means are formed by walls of a chamber of a pressure fluid piston-cylinder unit.

9. Automatic lathe as claimed in claim 8, wherein said piston-cylinder unit is a double acting unit designed to selectively load either one of both sides of said piston with pressurized fluid.

10. Automatic lathe as claimed in claim 7, wherein said drive element is a threaded spindle and wherein a nut providing said entrainment element is arranged on said threaded spindle.

11. Automatic lathe as claimed in claim 1, wherein said displacement measuring means is adapted to determine the position of said slide relative to said machine base.

12. Automatic lathe as claimed in claim 1, wherein said drive element is undisplaceable relative to said machine base.

13. Automatic lathe as claimed in claim 1, wherein also the second one of said clamping devices has at least one clamping element with clamping surface zones adapted for clamping a part to be gripped between said surface zones when the second clamping device is closed by said actuating means, said second clamping device being designed such that, when the second clamping device is closed by said actuating means, said surface zones of the second clamping device undergo a movement having a component parallel to said spindle axis.

14. Automatic lathe as claimed in claim 1 and having a stop means lockable relative to said machine base, said slide being adapted to abut on said stop means when the distance between the two spindles is being increased.

* * * * *